July 28, 1931.  W. H. ROBERTSON  1,816,263
CASH REGISTER
Filed May 3, 1926   11 Sheets-Sheet 1

Inventor
William H. Robertson
By
His Attorneys

July 28, 1931. W. H. ROBERTSON 1,816,263
CASH REGISTER
Filed May 3, 1926 11 Sheets-Sheet 2

Inventor
William H. Robertson
By Carl Beust
Henry E. Stauffer
His Attorneys

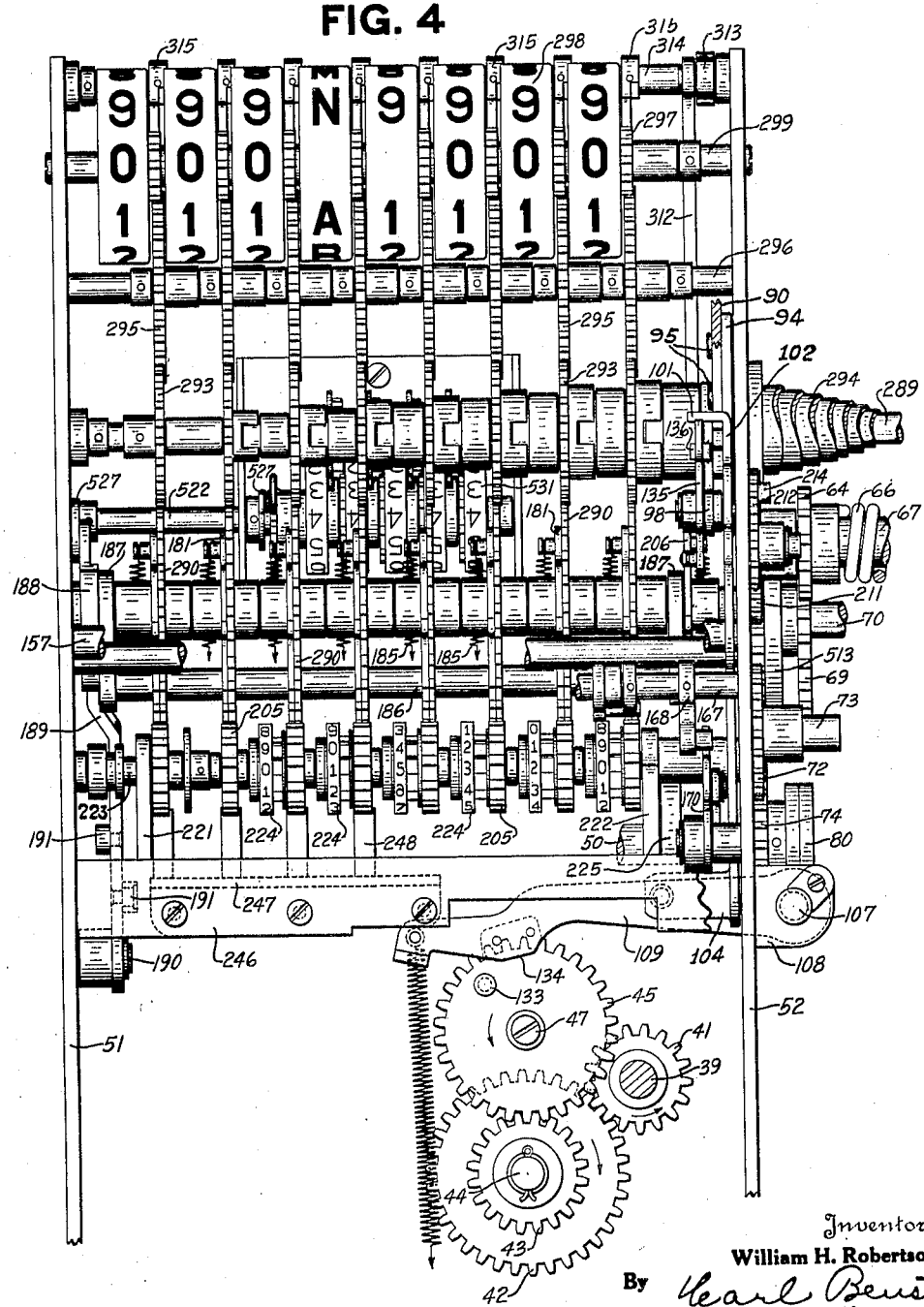

July 28, 1931.  W. H. ROBERTSON  1,816,263
CASH REGISTER
Filed May 3, 1926   11 Sheets-Sheet 4
FIG. 5
FIG. 6
FIG. 7
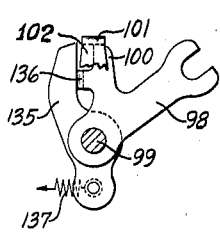
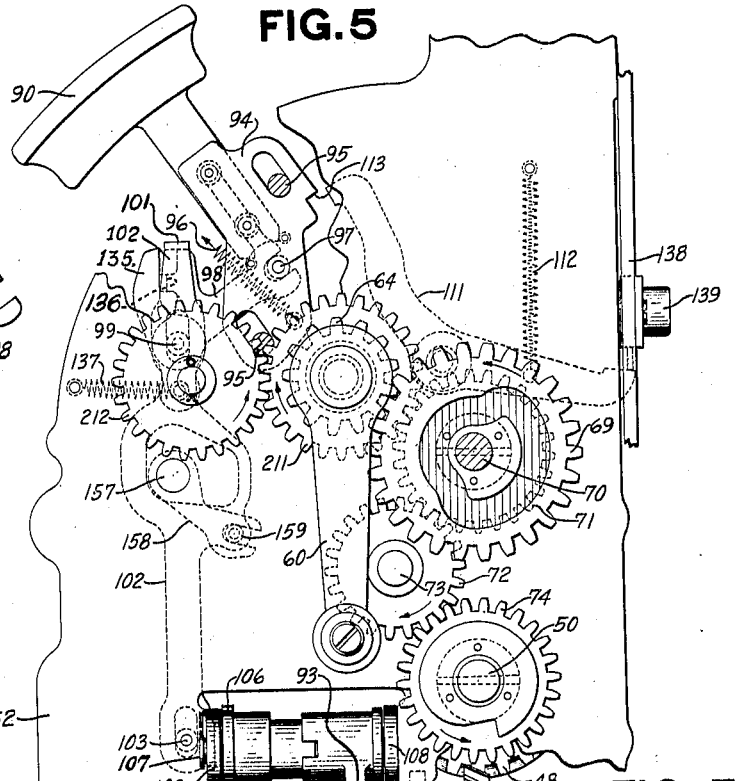
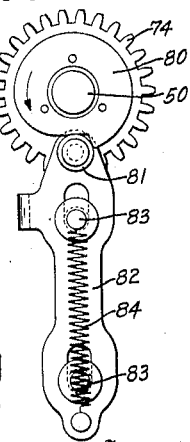
Inventor
William H. Robertson
By Earl Beyst
Henry E. Stauffer
His Attorneys July 28, 1931. W. H. ROBERTSON 1,816,263
CASH REGISTER
Filed May 3, 1926 11 Sheets-Sheet 5

Inventor
William H. Robertson
By Hearl Beust
Henry E. Stauffer
His Attorneys

July 28, 1931. W. H. ROBERTSON 1,816,263
CASH REGISTER
Filed May 3, 1926 11 Sheets-Sheet 6
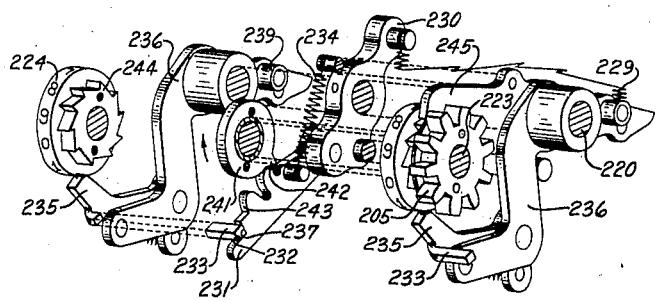
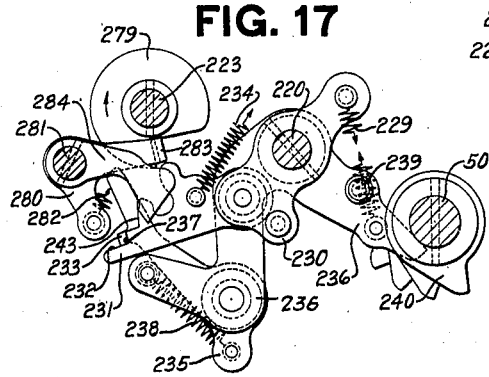
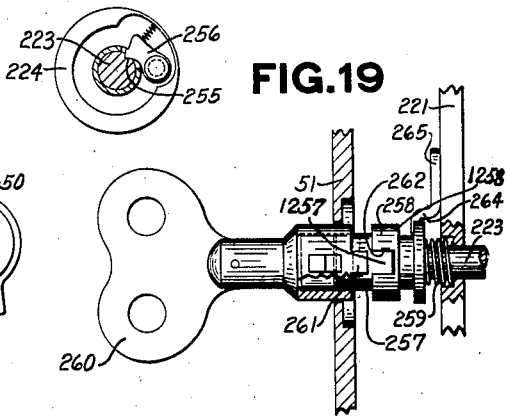
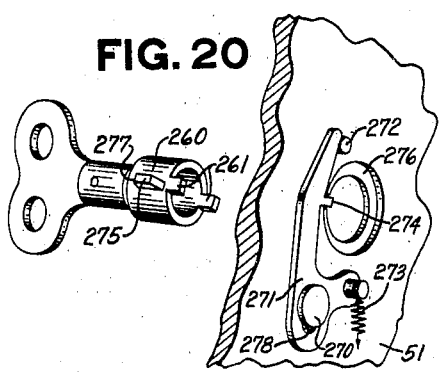
Inventor
William H. Robertson
By
His Attorneys

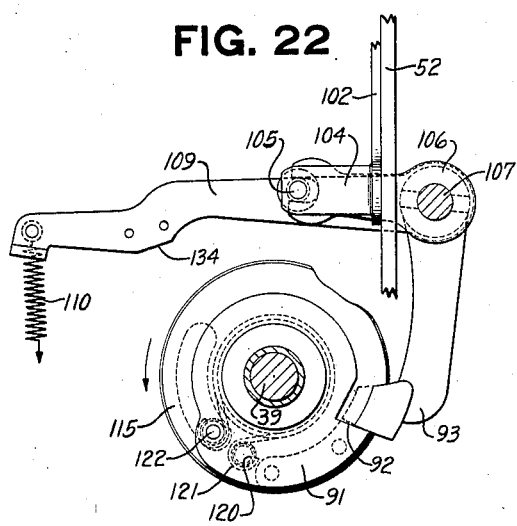
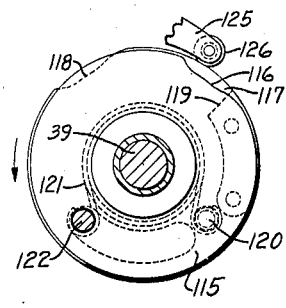
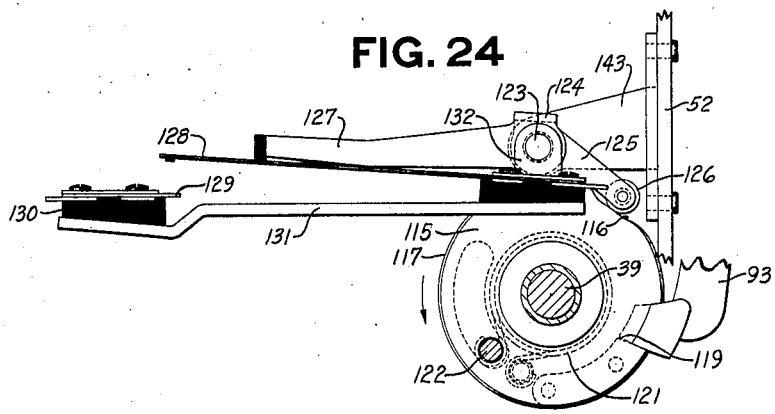
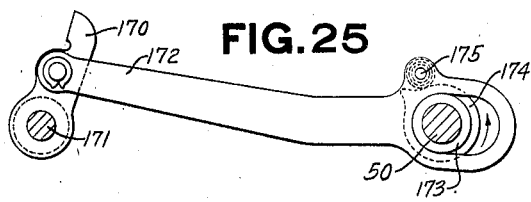

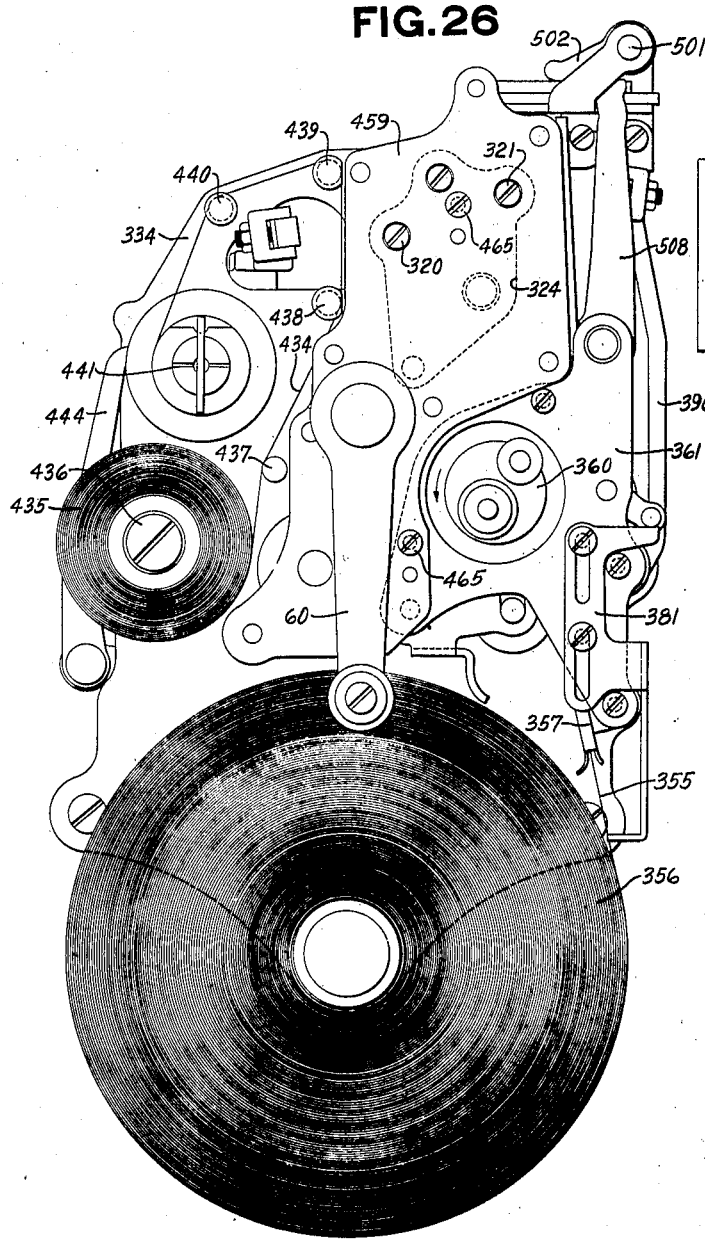

July 28, 1931.  W. H. ROBERTSON  1,816,263
CASH REGISTER
Filed May 3, 1926  11 Sheets-Sheet 9
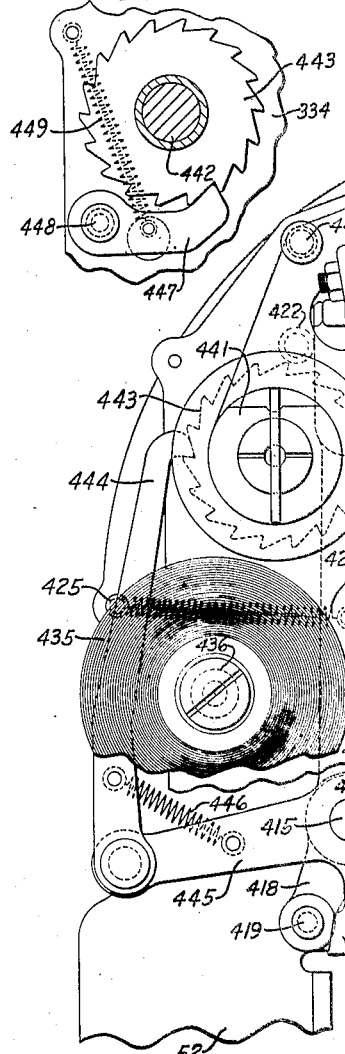
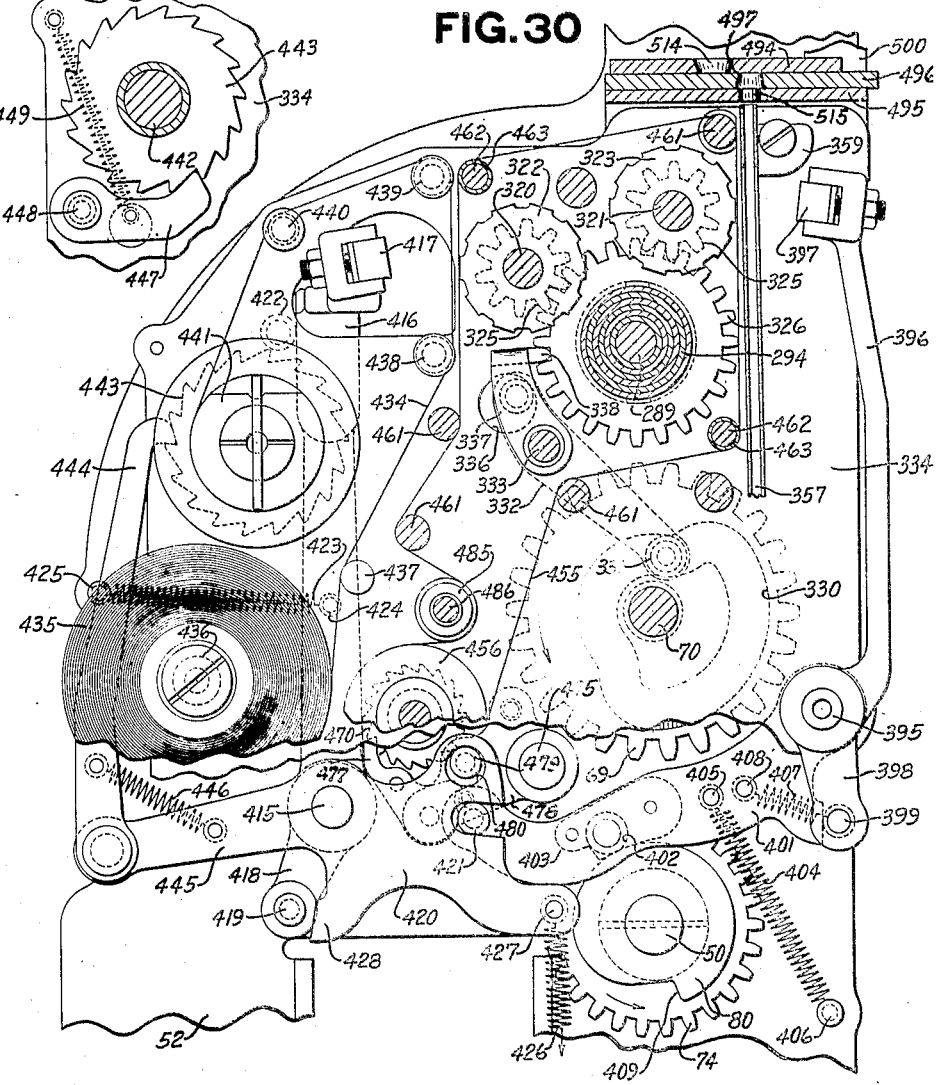
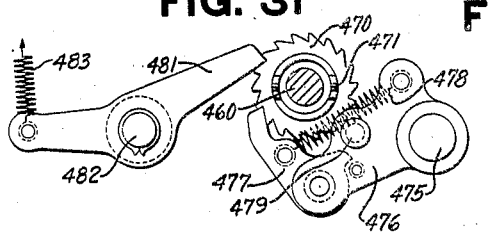
Inventor
William H. Robertson
By
His Attorneys July 28, 1931. W. H. ROBERTSON 1,816,263
CASH REGISTER
Filed May 3, 1926 11 Sheets-Sheet 10
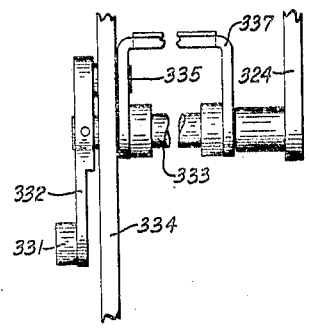
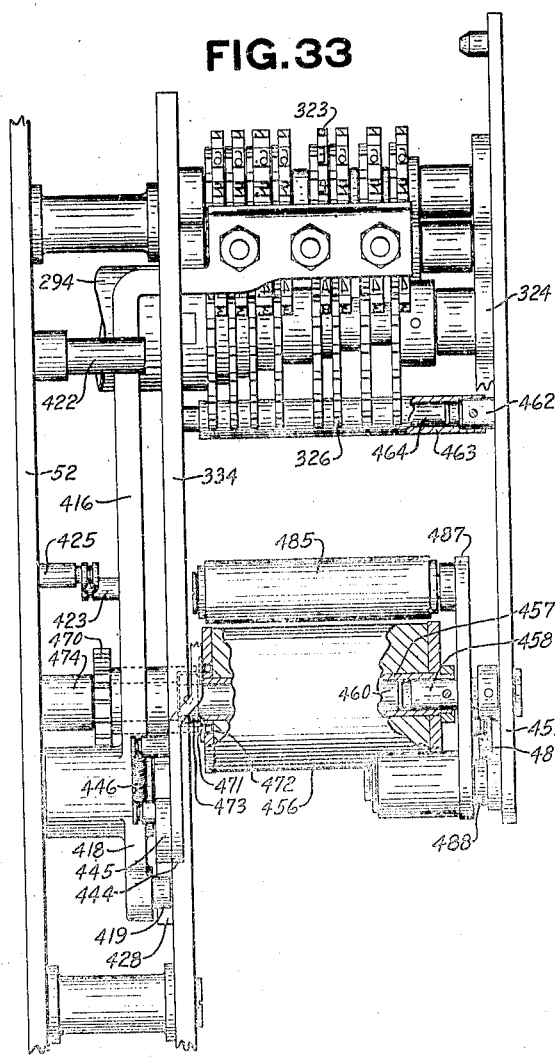
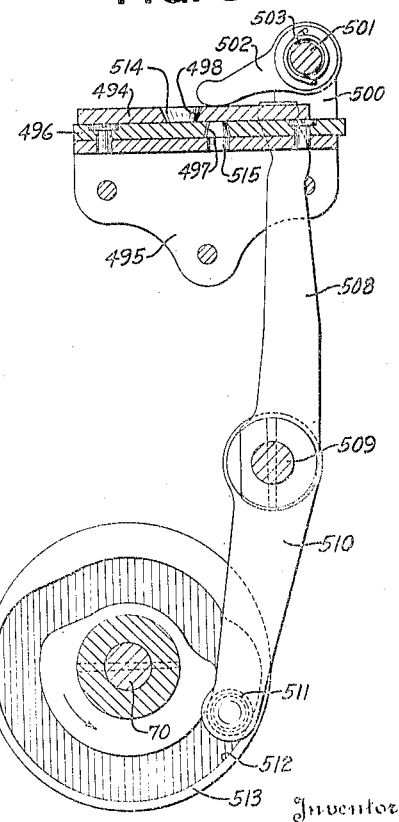
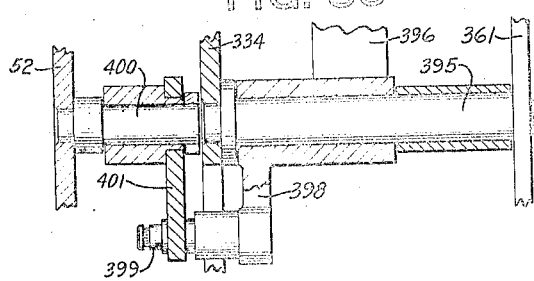
Inventor
William H. Robertson
By *Carl Beust*
*Henry E. Stauffer*
His Attorneys July 28, 1931.  W. H. ROBERTSON  1,816,263
CASH REGISTER
Filed May 3, 1926   11 Sheets-Sheet 11
FIG.37
FIG.38
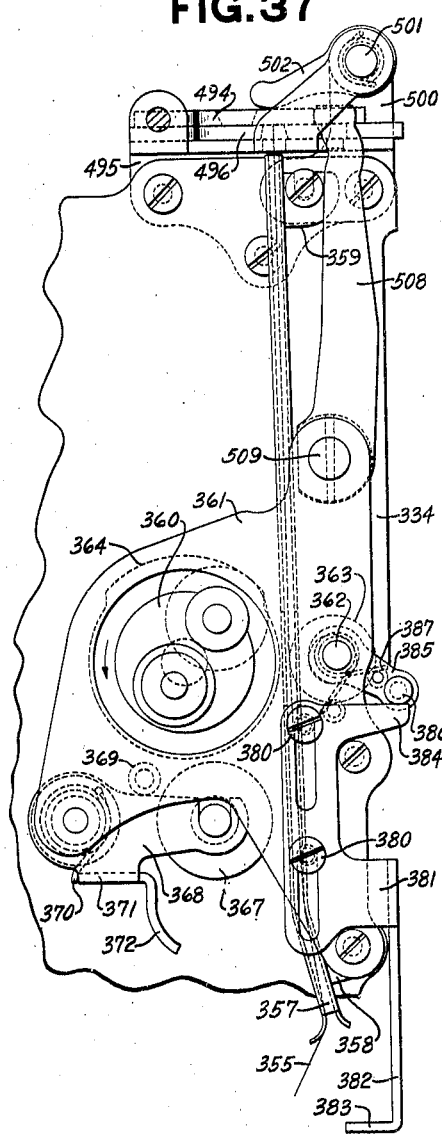
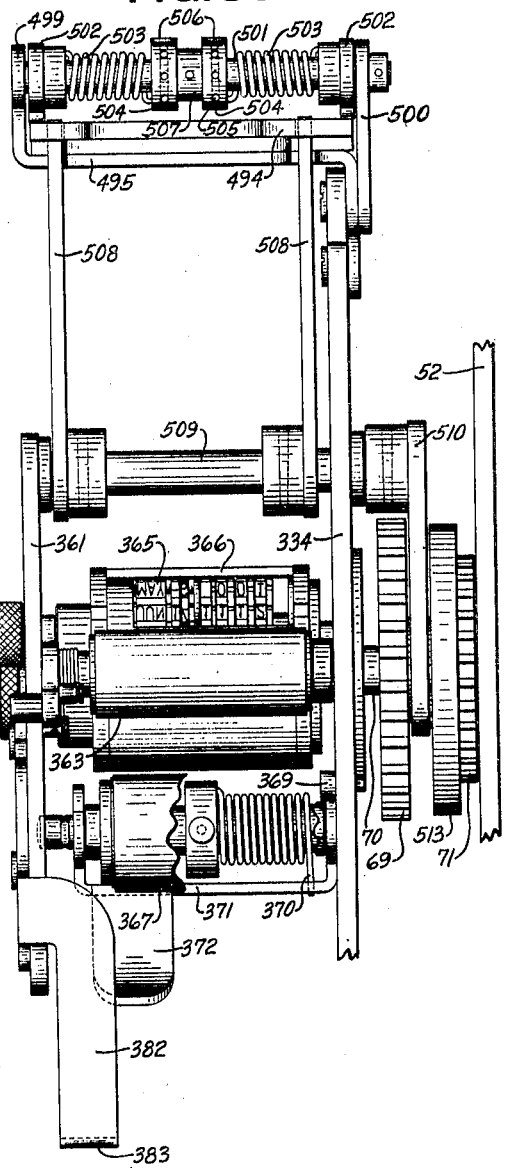
Inventor
William H. Robertson
By Earl Beust
Henry E. Stauffer
His Attorneys Patented July 28, 1931

1,816,263

UNITED STATES PATENT OFFICE

WILLIAM H. ROBERTSON, OF DAYTON, OHIO, ASSIGNOR TO THE NATIONAL CASH REGISTER COMPANY, OF DAYTON, OHIO, A CORPORATION OF MARYLAND

CASH REGISTER

Application filed May 3, 1926. Serial No. 106,454.

This invention relates to improvements in cash registers.

One object of this invention is the provision of a machine having a novel organization of parts, simple and inexpensive to manufacture, easy and quick in operation, combined with accuracy and a minimum number of parts to accomplish the desired results.

Another object of this invention is to provide an improved method of adjusting type wheels and indicators.

Another object is to provide a novel means for controlling the speed of operation of the operating handle of spring-operated cash registers.

With these and incidental objects in view, the invention includes certain novel features and combinations of parts, the essential elements of which are set forth in the appended claims, a preferred form of embodiment the invention being hereinafter described with reference to the accompanying drawings which form a part of this specification.

In the drawings:

Fig. 4 is a front elevation of the machine with the cabinet and certain other parts omitted.

Fig. 5 is a right-hand end elevation of the machine showing the operating mechanisms, parts being broken away.

Fig. 6 is a detailed view of part of the machine release mechanism.

Fig. 7 is a detailed view of a mechanism for alining the main cam shaft in its normal or home position.

Fig. 16 is a disassembled perspective view illustrating the transfer mechanism for the totalizer.

Fig. 17 is a detail view, partly in section, of the transfer mechanism for the totalizer.

Fig. 18 is a fragmentary detail view of one of the totalizer elments showing the resetting pawl.

Fig. 19 is a detail view showing the resetting key inserted in the machine.

Fig. 20 is a detail perspective view of the resetting key and the pawl for arresting the key when the totalizer elements have been cleared or set back to their zero positions.

Fig. 21 is a detail side view of the left-hand totalizer frame.

Fig. 22 is a detail side view of the motor clutch release mechanism.

Fig. 23 is a fragmentary detail view of a part of the motor clutch mechanism in its released position.

Fig. 24 is a detail view of the motor switch.

Fig. 25 is a detail view of the key release operating mechanism.

Fig. 26 is a side view of the printing mechanism.

Fig. 27 is a facsimile of the receipt issued by the machine.

Fig. 28 is a facsimile of a fragmentary portion of the detail strip.

Fig. 29 is a detail view of the retaining pawl for the detail feeding mechanism.

Fig. 30 is a vertical cross-sectional view taken through the printing mechanism.

Fig. 31 is a fragmentary detail view of the ribbon feeding mechanism.

Fig. 32 is a detail view of a ribbon tensioning device.

Fig. 33 is a front elevation, partly in section, of one of the printing hammers, the detail strip type wheels, and a part of the ribbon feed mechanism.

Fig. 34 is a fragmentary detail view of the type wheel aliner.

Fig. 35 is a detail view, partly in section, of the knife operating mechanism.

Fig. 36 is a detail sectional view showing the method of mounting one of the impression hammers and its driving arm.

Fig. 37 is a side elevation of the receipt paper feeding mechanism and a part of the severing mechanism.

Fig. 38 is a rear elevation of the mechanism shown in Fig. 37.

In general

Figure 1:
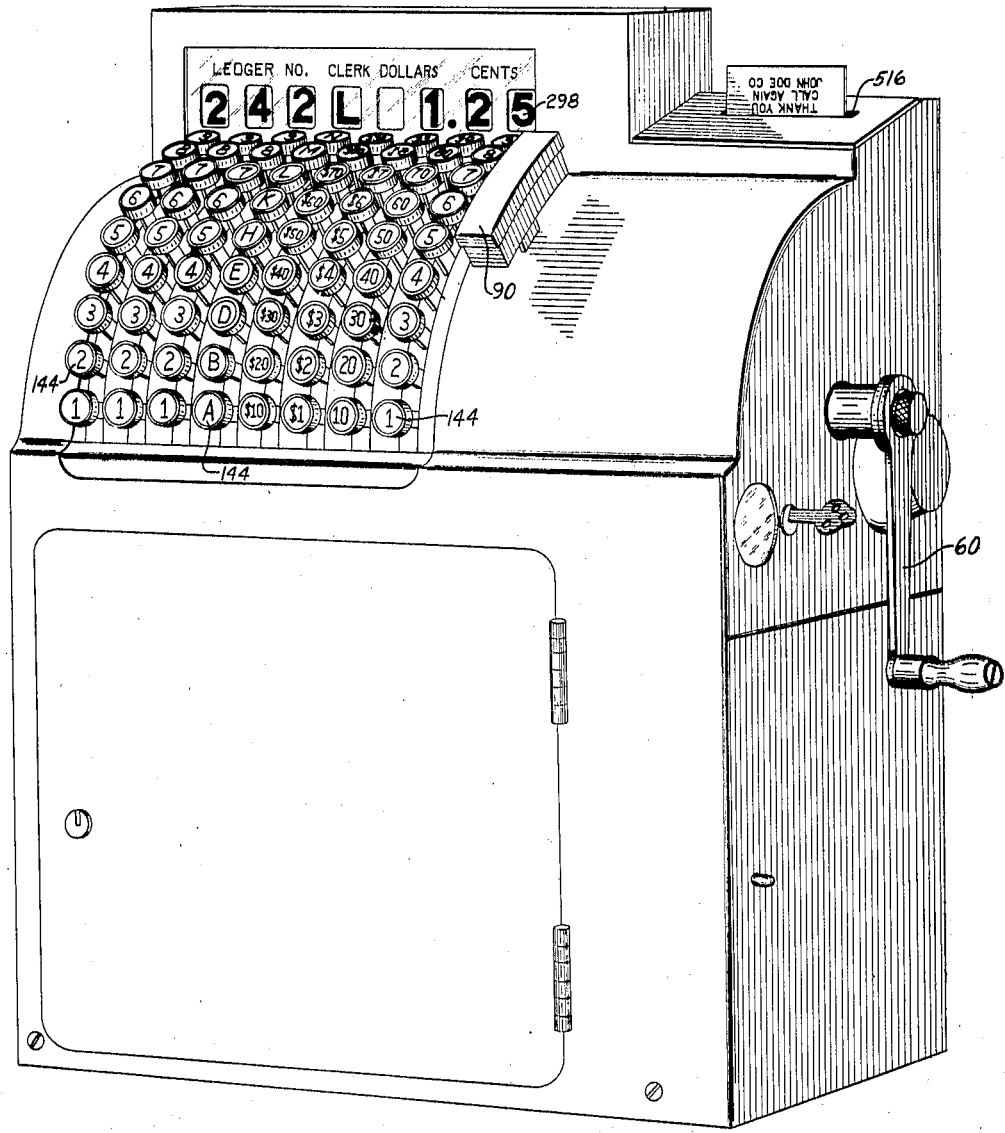
Fig. 1 is a perspective view of the machine, enclosed within its cabinet.
Figure 3:
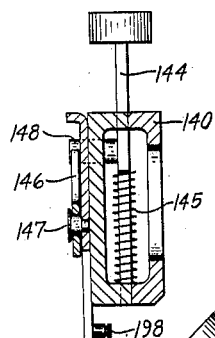
Fig. 3 is a detailed cross-sectional view taken through a key bank, on line 3—3 of Fig. 2.

The machine, herein disclosed, is shown provided with four amount, one clerk's and three ledger number banks of keys. All eight banks are identical in construction, but only the four amount banks are used for entering amounts in the totalizer. All eight banks are used to control the printing and indicating on the data of each transaction. The machine may be operated either by a motor or by means of an operating handle. The machine is provided with a totalizer for accumulating the amounts set up on the amount banks of keys, which totalizer is actuated under control of a spring-actuated differential mechanism. The type wheels and indicators are positioned by a train of mechanism operated by the totalizer elements while the amount is being added therein. Means is also provided for regulating the speed at which the operating crank can be operated, to afford the spring-actuated differentials sufficient time to operate. The machine is also provided with a printer for recording the data of each transaction on a detail strip which remains in the machine, and on a receipt, which is subsequently issued from the machine and severed. A customer counter registers the number of operations of the machine.

In detail

Operating mechanism

After the operator has depressed the particular keys of the keyboard representing the instant transaction, he may release the machine for operation by depressing the motor bar 90, and then operate the machine manually by the crank 60, or the usual electric motor drive, such as is shown and described in U. S. Letters Patent to Kettering and Chryst, No. 1,144,418, dated June 29, 1915, may be provided, in which latter case, depression of the motor bar will release the motor drive to operate the machine.

Such a motor 30 (Fig. 5) drives the main cam shaft 50 through one complete rotation at each operation of the machine, by a train of mechanism including a pinion 32 fast on the armature shaft 33 of the motor, which pinion, through gears 34, 36, 37, clutch mechanism 38, and the train of gears 41, 42, 43 and 45, drives a worm wheel 46 meshing with a worm gear 48 fast on the main shaft 50.

Flexible drive mechanism

Figure 13:
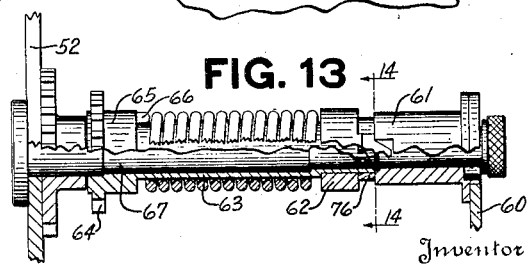
Fig. 13 is a detail view, partly broken away, showing the flexible connection between the operating handle and the machine.

The operating handle 60 (Figs. 5, 8 and 13) when used in place of the motor drive, may releasably engage with a flexible drive mechanism for preventing the sudden application of power manually to the main drive shaft, and the consequent jarring and injurious jarring and injurious jerking of the mechanisms, as follows. A sleeve 63 (Fig. 13) journaled on a stud 67 projecting from the right-hand side frame 52 of the machine, carries a clutch member 62 journaled on its outer end, a pinion 64 being secured by its hub 65 to the inner end of the sleeve. A hub 61 on the handle 60 is adapted to be removably applied to the outer end of the stud 67, the hub 61 of the handle constituting a clutch member to coact with the clutch collar 62. One end of a coil spring 66 is connected to the hub 65, the other end being connected to the clutch collar 62. When the operator turns the handle 60, the pinion 64 will be driven through the spring 66. The pinion 64 meshes with a gear 69 (Fig. 5) secured to a shaft 70 projecting from the end of a printing cylinder to be hereinafter described. Also secured to the shaft 70 is a gear 71 meshing with an intermediate gear 72 journaled on a stud 73 mounted in the right side frame 52 of the machine. The gear 72 meshes with a gear 74 secured to the main cam shaft 50. Two complete rotations of the operating handle 60 causes the cam shaft 50 to make one complete rotation in a clockwise direction in the manner above described.

Figure 14:
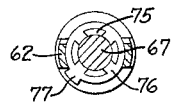
Fig. 14 is a fragmentary detail view taken on line 14—14 of Fig. 13, illustrating one means for regulating the tension of the spring between the operating handle and the machine.

The outer end of the sleeve 63 is provided with four prongs 75 (Fig. 14) projecting into notches in a washer 76 (see also Fig. 13) mounted on the stud 67. A peripheral shoulder 77 on the washer provides a stop for the clutch collar 62. When it is desired to change the tension on the spring 66, the washer 76 is disengaged from the prongs 75 and, while its shoulder 77 remains in contact with a tenon of the clutch member 62, the washer is rotated on the stud 67 until the proper tension has been obtained, whereupon it is again engaged with the prongs 75. In this manner the tension of the spring 66 can be controlled according to the requirements of the machine.

Alining main cam shaft

Mechanism is provided for alining the main cam shaft in its home position. Secured to the gear 74 (Fig. 7) is a cam 80 which cooperates with a roller 81 mounted on a slide 82 supported by two studs 83 projecting from the right side frame 52. A spring 84 stretched between a stud on the slide 82 and the upper stud 83, holds the roller 81 in engagement with the cam 80. The cam 80 is so formed that near the end of the operation of the machine the spring 84, slide 82 and roller 81 will insure the return of the shaft 50 to its home position. This mechanism is old and well known in the art, and therefore, no further description is thought necessary.

*Release mechanism*

A mechanism is provided for locking the machine against operation until the operator depresses a motor bar 90 (Figs. 1 and 5). Depression of the motor bar will not only release the machine for operation, but will also cause a switch in a circuit through the motor 30 to be closed to energize the motor for driving the machine (Fig. 24). This mechanism is old and well known in the art and therefore, only a brief description will be given herein. For a detailed description reference may be had to the above-mentioned patent.

As heretofore explained, the motor 30 (Fig. 5) with its armature shaft 33 and pinion 32, drives the gear 34, and bevel pinion 36 which latter meshes with a bevel gear 37 fast with a drum 38 constituting a clutch housing journaled on the stud 39.

A driven clutch member 160 journaled on a sleeve rotatable on the stud 39, carries spring-pressed clutch rolls co-acting with the clutch drum 38 and is shouldered, as at 1601 (Fig. 5). A clutch detent 93 has a hub journaled on a rod 107 supported in ears 108 struck out from the right side frame 52. The free end of the clutch detent normally lies in the path of the shoulder 1601 on the clutch member 160 to maintain the clutch disengaged.

The free end of the clutch detent is sufficiently broad to also engage a shoulder 92 (Fig. 22) formed on a disk 91 located adjacent to the driven clutch member 160 and connected with the gear 41 of the drive train.

Before the machine can be operated, it is necessary to disengage the detent 93 from the shoulders 92 and 1601 by depressing the motor bar. The motor bar 90 is detachably mounted on a sliding plate 94 (Fig. 5) which is supported by two studs 95 projecting from the inner face of the right-hand side frame 52. A spring 96 tends to hold the motor bar in its outer position. Mounted on the slide 94 is a stud 97 which engages a bifurcated arm of a bell crank 98 (Fig. 6) pivoted on a stud 99 carried by the right side frame 52. The bell crank 98 has an upwardly extending arm 100 which, when the machine is at rest, lies in contact with and supports a lip 101 on the upper end of a link 102 to prevent the link from being lowered. The link 102 is slidably mounted on the stud 99 and a stud 103 carried by the side frame 52 and has a laterally extending flange 104 (Fig. 22) which carries a stud 105 projecting into the bifurcated outer end of an arm 106, loosely mounted on the rod 107. The rod 107 is carried between two ears 108 (Fig. 5) formed on the side frame 52. The arm 106 is clutched to the hub of the clutch detent 93, (Fig. 5). Secured to the hub of the detent 93 is an arm 109 (Fig. 22), the left-hand end of which has connected thereto a spring 110. The spring 110 normally tends to rock the detent 93, and the arm 106 in a counter-clockwise direction, but is prevented from doing so by the lip 101 (Fig. 5) which normally rests on the arm 100 of the bell crank 98. When the motor bar 90 is depressed, the bell crank 98 is rocked in a clockwise direction (Figs. 4 and 5) by means of the stud 97 on the slide 94, thereby removing the arm 100 from beneath the lip 101 to enable the link 102 to be lowered under the influence of the spring 110 (Fig. 22). This movement shifts the detent 93 out of contact with the shoulder 92 of the disk 91 and also out of contact with the shoulder 1601 on the clutch member 160 to enable the machine to be operated either by the motor 30 or by the operating handle 60.

In machines of this type, the motor circuit is normally interrupted to prevent the flow of current to the motor. Hence, in addition to releasing the clutch mechanism, it is also necessary to release the ordinary spring-blade switch to complete the power circuit to the motor. This is conveniently effected as follows.

Upon the previous operation, the detent 93 (Figs. 5, 22, 23 and 24) dropped into the path of the shoulder 1601 on the clutch member 160 and into the paths of shoulder 92 on the disk 91 and the block 119 on the complementary disk 117.

During the rotation of the disks on the previous operation, the block 119 of the disk 117 strikes and is arrested by the detent 93 before the shoulder 92 on the disk 91 strikes the detent. The arrest of the disk 117 prior to the arrest of the disk 91 enables the disk 91 to advance relatively to the disk 117 so as to bring the respective peripheral recesses 116, 118 into registry with each other and with a roll 126 (Fig. 24) carried by one arm 125 of a switch controlling lever 127 pivoted on a pin 123 mounted in an ear 132, and a flange 143.

The lever 127 extends over a spring blade 128 forming one of the contacts of an electric switch 128, 129, and when the disks 117 and 91 come to rest with their recesses 116, 118 in register with each other and with the roll 126, the spring switch blade 128 rocks the lever 127, 125 clockwise and shifts out of contact with its companion contacts 129 to break the motor circuit.

A bracket 131 supports the stationary switch terminals 129 suitably insulated therefrom as at 130. This bracket also supports the ear 132 for the pivot pin 123, a block of insulation being interposed between the ear and the bracket, which insulation also supports the base of the spring blade 128.

The foregoing mechanism is fully shown and described in the prior patents above mentioned to which reference may be made for a more detailed explanation.

Secured to the gear 45 (Fig. 4) is a stud 133, so located that, near the end of the operation of the machine it will wipe along a surface 134 of the detent arm 109 (see also Fig. 22), thereby lifting the detent 109 to rock the arm 93 into the path of the shoulder 92 on the disk 91, and into the path of the shoulder 160 on the clutch member 160 to stop the machine. The detent 93 will also rock into the path of the block 119, thereby stopping the disk 117 in a position in which two recesses 116 and 118 coincide to permit the arm 125 to rotate on its stud 123 and enable the spring contacts 128 to disengage from the terminals 129. In this manner the circuit through the motor is opened and the motor is stopped.

A means is provided for preventing repeat operations of the machine, without first releasing and again depressing the motor bar 90. Loosely mounted on the shaft 99 (Figs. 5 and 6) is a non-repeat pawl 135 normally held in engagement with a flange 136 on the arm 100 of the bell crank 98, by a spring 137. When the arm 100 is withdrawn from beneath the lip 101, the pawl 135 moves into contact with the left side of the lip 101 under influence of the spring 137. When the arm 109 (Fig. 4) is raised by the stud 133, the link 102 (Fig. 5) is raised high enough to permit the arm 100 to again move beneath the lip 101. If, however, the operator should hold the motor bar 90 in the depressed position, throughout the operation of the machine, the arm 100 is held in its withdrawn position, so that when the link 102 and its lip 101 rise at the end of the operation of the machine, the pawl 135 rocks beneath the lip 101, under the influence of the spring 137, thereby preventing the link 102 from being lowered again, under the influence of the spring 110 after the stud 133 passes from beneath the detent arm 109. Under this condition, the machine cannot be released again until the operator permits the motor bar 90 to return to its outer position, which permits the arm 100 to rock beneath the lip 101. This movement of the arm 100, through the contact of the flange 136 with the pawl 135, moves the pawl 135 from beneath the lip 101.

*Motor bar lock*

A means has been provided for locking the motor bar 90 against depression when it is desired to prevent operation of the machine. Mounted on a back frame 138 (Fig. 5) is a lock 139. Pivoted on a stud in the side frame 52 is a lever 111 which tends to rotate in a counter-clockwise direction under the influence of a spring 112, one end of which is connected to a stud on the lever, and the other end to a stud in the side frame 52. The upper end of the lever 111 is adapted to engage a shoulder 113 in the sliding plate 94, but is prevented from doing so by the bolt of the lock 139 when in its unlocked position. When it is desired to lock the machine, the bolt of the lock is withdrawn, thereby permitting the spring 112 to rotate the lever 111 to engage its upper end with the shoulder 113, to prevent depression of the motor bar, and in this manner prevent release of the machine.

*Keyboard*

The keys 144 (Figs. 1 and 2) comprising each bank are slidably mounted in separate key frames 140 (Fig. 2) arranged side by side and supported on two cross rods 141 and 142 carried by the main side frames 51 and 52. Springs 145 return the keys to and hold them in their undepressed positions. A detent bar 146 is slidably mounted on studs 147 in each key bank. Mounted on each key is a stud 148 adapted to cooperate with the usual hooks on the detent bar 146. When a key is depressed, the stud 148 cams the detent bar 146 downwardly until the flattened portion 149 of the stud passes beneath its corresponding hook 150 on the detent bar, whereupon a spring 151 shifts the detent bar 146 to be moved upwardly part way to its home position, to latch the key in its depressed position.

A means is provided for locking the detent bar in either its locking, or in its home position while the machine is operating. The lower end of the detent bar 146 is bifurcated to embrace a stud 152 mounted on an arm 153 provided with a notch 154. The arm 153 is loosely mounted on a shaft 167 carried by the side frames 51 and 52. When a key is depressed, the arm 153 is rocked clockwise to bring its notch 154 into alinement with a locking flange 155 formed on a bar secured to a pair of arms 156 fast on a locking shaft 157 carried by the side frames 51 and 52. Also secured to the locking shaft 157 (Fig. 5) is an arm 158 bifurcated to engage a stud 159 on the above mentioned link 102. When the motor bar 90 is depressed to release the machine, and the link 102 is permitted to move downwardly as above described, the arm 158 and locking shaft 157 are rocked in a clockwise direction and move the locking flange 155 into the notch 154 in the arm 153, thereby locking the detent 146 in its locking position.

If no key in a bank is depressed, the detent bar 146 for that bank will be locked against movement by the locking flange 155 engaging the lower side of the arm 153. This will prevent depression of a key after the machine has started to operate.

Near the end of the operation of the machine, the keys 144 are released. A mechanism shifts the detent bar 146 downwardly far enough to disengage the hooks 150 from the studs 149 to permit the springs 145 to return the keys 144 to their outer positions.

Mounted on each arm 153 is a stud 165 which contacts an arm 166 secured to a release shaft 167 journaled in the side frames 51, 52. Also secured to the release shaft 167 is an arm 168 having a stud 169 cooperating with an arm 170 loosely mounted on a stud 171 in the side frame 51. Pivoted to the arm 170 is a pitman 172 (see also Fig. 25), the right end of which is slotted to surround a collar 173 on the main operating shaft 50. Secured to the drive shaft 50 is a cam 174 which cooperates with a roller 175 on the pitman 172. Near the end of the operation of the machine, and after the flange 155 has been disengaged from the notch 154, the cam 174 contacts the roller 175, thereby camming the pitman 172 toward the left (Fig. 25) to rock the arm 170 in a counter-clockwise direction. Counter-clockwise movement of the arm 170 (Fig. 2) rocks the arm 168 and, through the release shaft 167, rocks the arms 166 clockwise, against the studs 165 to rock the arms 153 clock-wise. Clockwise movement of the arms 153 lowers the detent bars 146 far enough to disengage the hooks 150 thereon from the key studs 148, thereby permitting the springs 145 to restore the keys to normal.

The arms 153 are provided with shoulders 176 to prevent the arms from swinging down too far when the key banks are removed from the machine. When the detent bar 146 becomes disengaged from the stud 152, the arm will be free to rotate until the shoulder 176 contacts the flange 155, whereupon it will be stopped.

Differential mechanism

The differential mechanisms for all banks are identical, and therefore, only one will be described herein. This differential is of the spring-actuated type, that is, the type in which the actuator is set under the influence of a spring, the differential movement thereof being controlled by the depressed key.

Figure 2:
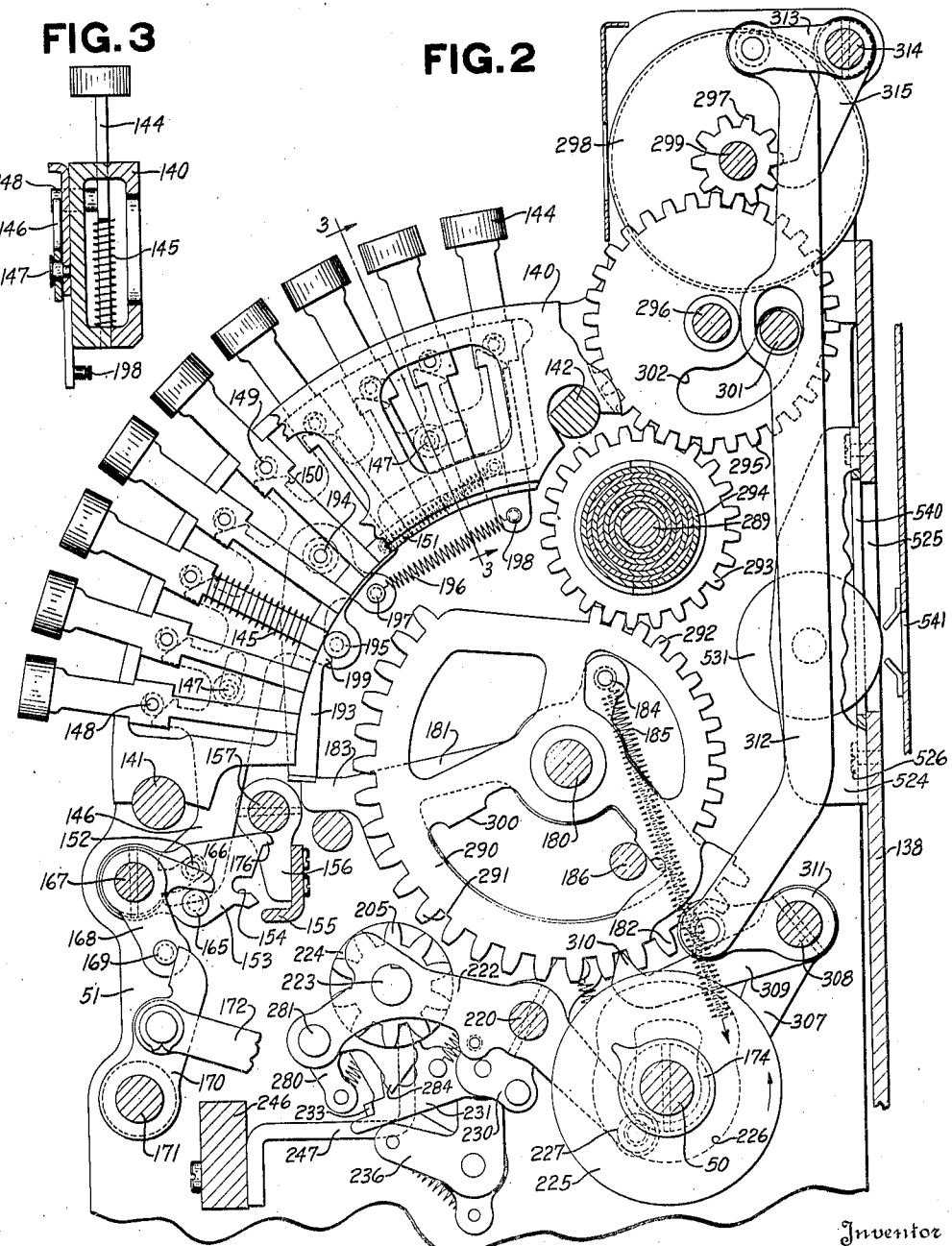
Fig. 2 is a vertical cross-sectional view, showing one of the amount banks, and associated mechanism.
Figure 10:
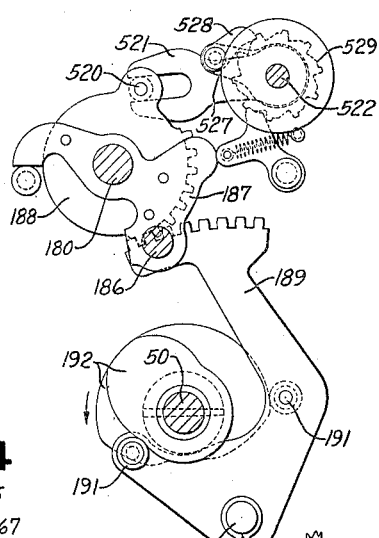
Fig. 10 is a detailed view of the mechanism for controlling the differential, the customer counter being shown in end elevation.

Carried by the side frames 51 and 52 is a rod 180 (Fig. 2). Pivoted on the rod 180 is a segmental actuator 181, provided with teeth 182 and having a forward extension 183. The actuator 181 has a tail supporting a stud 184 to which one end of a spring 185 is connected, the other end of which is connected to a rod (not shown) carried by the side frames 51 and 52. The spring 185 normally tends to rock the actuator 181 in a clockwise direction, but is prevented from doing so by a restraining and restoring bar 186 (Figs. 2, 4 and 10) carried by a pair of arms 187 pivoted on the cross rod 180. Secured to the left-hand arm 187 (Figs. 4 and 10) is a disk 188 having teeth engaging the teeth of a segment lever 189 pivoted on a stud 190 carried by the side frame 51. The segment lever 189 has mounted thereon in spaced relation a pair of rollers 191 which cooperate with a pair of cams 192 secured to the drive shaft 50.

When the drive shaft 50 rotates during the operation of the machine, the cams 192 will positively rock the segment lever 189 through a constant path, and the lever in turn, will rock the arms 187 and the restraining and restoring bar 186 first in a clockwise direction (Fig. 10), thereby permitting the actuator 181 (Fig. 2) to be rocked under the influence of the spring 185 until stopped by the end of a depressed key or by a zero stop pawl 193 hereinafter described. The restraining and restoring bar 186 moves far enough to permit nine steps of movement of the actuator 181, even though the actuator is stopped before it reaches the "nine" key.

The zero stop pawl 193 is pivoted on a stud 194 carried by the key bank frame 140 and is normally held in contact with a stud 195 mounted on the detent bar 146 by a spring 196 stretched between a stud 197 on the zero stop pawl 193 and a stud 198 on the key bank frame 140. When the detent bar is moved downwardly, by the depression of a key 144, the stud 195 will wipe along a shoulder 199 on the zero stop pawl 193 to cam the zero stop pawl in a clockwise direction, thereby shifting it out of the path of the extension 183 of the actuator 181. This enables the actuator 181 to advance past the zero position until arrested by the inner end of the stem of the depressed key 144.

After the actuator 181 has been positioned under control of one of the keys 144, a totalizer pinion 205 is engaged therewith in a manner to be hereinafter described. After the totalizer pinion is engaged with the actuator 181, the segment lever 189 (Fig. 10) is rocked clockwise by the cams 192, thereby returning the restraining and restoring bar 186 in a counter-clockwise direction, to restore the actuator 181 to its home position. During such restoration the actuator 181 will add an amount on the totalizer pinion commensurate with the value of the key depressed.

An actuator 181 is also provided for the clerks' and ledger number banks, but the actuators for these banks are used only for the purpose of adjusting the type carriers and indicators. The manner in which this is accomplished will be hereinafter described. It is sufficient to state here that the pinions 205 for these banks are not secured to totalizer elements, as is the case with the pinions 205 for the amount banks. However, a totalizer element is provided adjacent the pinions 205 for the clerks' bank and one adjacent one of the ledger number banks, but they are only used as overflow wheels for the totalizer associated with the amount bank of highest denomination.

Speed control

When the machine is operated manually, were it not for the following described mechanism, it would be possible to operate the handle 60 so rapidly as to cause the restraining and restoring bar 186 (Fig. 2) to start its return movement before the springs 185 have time to properly advance the actuators 181, thereby causing incorrect amounts to be added and recorded. In order to prevent this, a mechanism has been provided for temporarily stopping the operating handle until the springs 185 have had time to position the actuators. This mechanism is effective only when the handle is operated too fast.

Mounted on the cross rod 180, adjacent the right-hand arm 187, is a control segment 206 (Fig. 8) similar to the segmental actuator 181, and provided with a spring 204, which normally holds the segment 206 in engagement with the restraining and restoring bar 186. Mounted on the segment 206 is a stud 207 which lies in the path of a flange 208 formed on a bell crank 209 pivoted on a stud 210 carried by the side frame 52. Meshing with the gear 71 forming one of the train of gearing from drive shaft 50 is a gear 211 mounted on the stud 67. The gear 211 also meshes with a gear 212 mounted on a stud 213 carried by the side frame 52. Secured to the gear 212 is a stud 214 into the path of which an upwardly extending arm 215 of the bell crank 209 projects.

Figure 8:
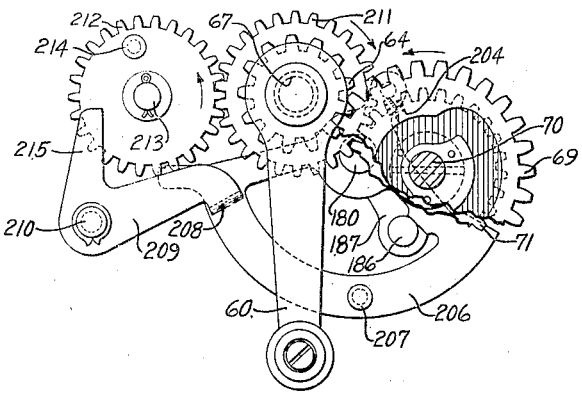
Fig. 8 is a detail view, showing a mechanism for controlling the speed of operation of the operating handle.

When the machine is operated by the handle 60, and the segment lever 189 (Fig. 10) rotates the arms 187 to move the restraining and restoring bar 186 in a clockwise direction, the control segment 206, Fig. 8, will follow under the influence of its spring 204. The spring 204 is weaker than the springs 185 for the actuators 181, and therefore, the action of the control segment 206 is slower than the action of the actuators 181. Meanwhile the pinion 64 in mesh with the gear 69, turns the shaft 70 and the gear 71 fast thereon. The gear 71 in mesh with the intermediate gear 211, rotates the gear 212 carrying the arresting stud 214. If the machine is operated in a normal manner, the stud 207 of the control segment 206, will engage the flange 208 of the bell crank 209, near the end of the clockwise travel of the restraining and restoring bar 186, thereby rocking the arm 215 out of the path of the stud 214 on the gear 212 before the stud 214 comes in contact therewith. If, however, the handle 60 is operated so fast that the restraining and restoring bar 186 moves faster than the actuators 181, the stud 214 will be arrested by the end of the arm 215 before the stud 207 contacts the flange 208, to prevent further rotation of the operating handle 60. After the springs 185 have had time enough to position the actuators 181, the spring 204 will have advanced the control segment 206 to cause the stud 207 to engage with the flange 208, thereby displacing the arm 215 from the path of the stud 214 to permit continued operation of the handle 60.

From this it is apparent that the handle cannot be operated so fast as to defeat the functions of the actuators 181 because the control segment 206 must be in its extreme left hand position (Fig. 8), before the arm 215 will permit the continued operation of the operating handle 60, and since the action of the control segment 206 is slower than that of the actuators 181, the actuators will complete their movements before the control segment 206 completes its movement.

Totalizer

As before mentioned, a totalizer is provided for accumulating the amounts set up on the keyboard. Secured to a shaft 220 (Figs. 2, 4 and 21), are arms 221 and 222. Carried by these two arms is a shaft 223 which supports the totalizer pinions 205 above mentioned. The four pinions associated with the amount banks have totalizer elements 224 secured thereto. The two left-hand elements 224 (Fig. 4) are also carried on the shaft 223, but these two are not secured to the adjacent pinions 205, and are used for overflow wheels. The location of these overflow totalizer wheels of highest denomination adjacent the clerks' bank and ledger number bank of keys is for convenience only, the overflow totalizer wheels having no connection with the banks of keys mentioned. It is apparent, however, that should it be desirable to construct a machine, all the banks of keys of which are to be amount keys, but little modification would be required, it being only necessary to secure the overflow totalizer elements to the pinions 205 thereto adjacent. Secured to the cam shaft 50 adjacent each of the arms 221 and 222 is a cam 225 (Fig. 2) having a cam race 226, into each of which projects a roller 227 mounted on each of the arms 221 and 222. The cam races 226 are both identical and are adapted to rock the totalizer pinions 205 bodily into engagement with the actuators 181 after the actuators have been adjusted under control of the keys 144, as above described. After an amount has been added on the totalizer elements, the cam races 226 will disengage the pinions 205 from the actuators.

The cam races 226 are so shaped as to snap the pinions 205 into mesh with the actuators 181 just after the latter have had time to advance to their full extent, and to disengage the pinions from the actuators immediately upon the restoration of the actuators to their home positions. The dwell portions of the cam races are of sufficient extent to positively retain the totalizer pinions 205 in mesh with the actuators during the restoration of the latter.

*Transfer mechanism*

The mechanism for carrying from a lower to a higher order totalizer element, when the lower element passes from "nine" to "zero", is of a type shown and described in Letters Patent of the United States, No. 497,860, issued to T. Carney on May 23, 1893, and is well known in the art, and therefore, only a brief description will be given herein. Secured to the shaft 220 (Figs. 16 and 17) adjacent each totalizer element 224 is an arm 230 upon which is pivoted a latch 231, the free end 232 of which is held in contact with a laterally extending finger 233 by a spring 234 stretched between a stud on the pawl 231 and a stud on a retaining pawl 245. The finger 233 is formed on a carrying pawl 235 pivoted on a transfer lever 236 journaled on shaft 220. The transfer lever 236 is normally held in and returned to its retracted position by a spring 229. The finger 233 is normally held in contact with a shoulder 237 on the latch 231 by a spring 238. The transfer lever 236 has mounted thereon a roller 239 which cooperates with a cam 240 secured to the drive shaft 50. Secured to each totalizer element 224 is a disk 241 (Fig. 16) having a long tooth 242. As the totalizer element passes from "nine" to "zero", the long tooth 242 contacts the transfer latch 231 and rocks it counter-clockwise (Fig. 17), to disengage the shoulder 237 of the latch from the finger 233, thereby permitting the spring 238 to rock the transfer pawl 235 until its finger 233 contacts a shoulder 243 on the latch 231. This movement of the transfer pawl 235 is sufficient to rock it into engagement with a ratchet 244 secured to the totalizer element 224 of the next higher denomination.

When the drive shaft 50 is rotated during an operation of the machine, the cam 240 will rock the transfer lever 236 in a clockwise direction, thereby causing the transfer pawl 235 to rotate the next higher totalizer element 224 forwardly one step. As the transfer pawl 235 is rotating the totalizer element one step, it is cammed counter-clockwise far enough to disengage the finger 233 from the shoulder 243 on the latch 231, thereby permitting the spring 234 to again rock the latch 231 upwardly to permit the finger to contact the shoulder 237 on the latch 231 and remain in contact therewith when the lever 236 returns to its home position under the influence of the spring 229.

The cams 240 are spirally spaced on the drive shaft 50 so that the levers 236 will be operated in succession, thereby permitting successive transfers to be made from the lowest order to the highest.

A retaining pawl 245 (Fig. 16), for each totalizing element 224 is mounted on the shaft 220 and cooperates with the ratchet wheels 244 to prevent retrograde movement thereof. The springs 234 hold the retaining pawls in engagement with the ratchet wheels at all times.

As before mentioned, the pinions 205 for the four higher banks are not secured to the totalizer elements 224. The retaining pawls 245 will hold the totalizer elements 224 for these four banks in proper alinement. However, when the totalizer is disengaged from the actuators 181, the pinions 205 for these banks would be free to rotate. Therefore, an independent alining means for these pinions must be provided so that the pinions will be in proper alinement when they rock into engagement with the actuators. Secured to a cross bar 246 (Figs. 2 and 4), carried by the side frames 51 and 52, is a bracket 247 having four upwardly extending alining teeth 248 so located that when the totalizer is disengaged from the actuators, the four left-hand pinions 205 (Fig. 4) will each be engaged with one of the alining teeth 248. The alining teeth are so positioned that the pinions will be engaged therewith only after they are disengaged from the actuators.

*Turn-to-zero mechanism*

The mechanism for turning the totalizer elements to zero is of a type well known in the art, and therefore, only a brief description will be given herein. The totalizer shaft 223 (Fig. 18) is provided with a longitudinal notch 255 with which a pawl 256 mounted on each of the totalizer elements 224 cooperates for turning the toalizer elements to zero. The totalizer shaft 223 projects through the totalizer arm 221 (Figs. 19 and 21) and has secured to the end thereof a collar 257 having tenons 1257. Slidably mounted on the totalizer shaft 223 is a coupling member 258, somewhat thicker than the collar and having mortices 262 adapted to accommodate the thinner tenons 1257 of the collar 257. The coupling member 258 is held in engagement with the collar 257 by a spring 259 coiled around the shaft 223. One end of the spring 259 presses against the arm 221 and the other end against the coupling member 258. The collar 257 projects through a hole in the side frame 51. The cabinet of the machine is provided with an opening into which the hollow barrel of a key 260 (Figs. 19 and 20) can be inserted. The barrel of the key 260 fits over the collar 257 and is provided with prongs 261 also adapted to enter the mortices 262 in the coupling member 258 to enable the key to rotate the latter and the totalizer shaft 223. The coupling member 258 is provided with a peripheral groove 1258, one wall of which is notched, as at 263 (Fig. 21), to accommodate a lug 264 formed on a clip 265 secured to the arm 221. The clip 265 normally locks the totalizer shaft 223 in its home position. The spring 259 holds the coupling 258 with the notch 263 in engagement with the lug 264 until the operator fits the key 260 over the collar 257 and presses the key inwardly, whereupon the key will slide the coupling member 258 laterally on the totalizer shaft 223 to disengage it from the lug 264, the coupling 258 still maintaining its connection with the collar 257 the tenons of which are long enough to permit such relative movement. This will free the shaft 223 and permit it to receive one complete rotation sufficient to turn all of the totalizer elements 224 to zero.

A means is provided to stop rotation of the totalizer shaft 223 after the totalizer elements 224 have all been set to zero. Slidably mounted on a stud 270 (Fig. 20), carried by the side frame 51, is a pawl 271. The upper end of the pawl 271 is held in engagement with a stud 272 by a spring 273 and is provided with a lug 274 which projects into the opening in the side frame through which the key 260 must be inserted for turning the totalizer elements to zero. Mounted on the key 260 is an angularly shaped web 275 which engages the lug 274 when the key is inserted, to cam the pawl 271 out of its path about the stud 270 as a pivot. The opening into which the key 260 is inserted is provided with a counter-bore 276 having a single radial slot therethrough to accommodate the web 275 of the key. It will be remembered that in order to insert the key into the machine it is necessary to force it against the tension of the spring 259 in order to disengage the coupling member 258 from the clip 265. After the key has been inserted against the tension of the spring, and the operator starts to turn the key, the forward edge 277 of the web 275 is held in engagement with the inner wall of the counter-bore 276, thereby preventing the spring 259 from forcing the key out of the opening. Near the end of the rotation of the totalizer shaft 223 by the key 260, the web 275 will contact the lug 274 from beneath and upon further rotation will force the lug 274 and its pawl 271 upwardly until the lower end of a slot 278 in the pawl engages the pivot stud 270, thereby preventing further rotation of the key. At this time, the web 275 is again in position relatively to the radial slot in the counterbore 276 to permit removal of the key from the machine. After the key has been removed, the spring 273 restores the pawl 271 downwardly to the position shown in Fig. 20. When the key 260 is stopped by the lug 274 as just described, the notch 263 (Fig. 21) is again in alinement with the lug 264, and therefore the spring 259 slides the coupling member 258 laterally on the totalizer shaft 223 until the notch 263 fits over the lug 264.

A mechanism is provided to prevent the transfer latches 231 (Fig. 17) from tripping, when the totalizer is being turned to zero, and thereby causing a transfer to be made into each of the totalizer elements during the next succeeding operation. Secured to the totalizer shaft 223 is a cam 279 which cooperates with one arm of a bell crank lever 280 secured on a shaft 281 carried by the totalizer shaft arms 221 and 222. A spring 282 holds a lip 283 on the bell crank lever 280 in contact with the periphery of the cam 279. Also secured to the shaft 281 and adjacent each of the trip latches 231 is an arm 284, the fingers 233 of the carrying pawls 235 lying in the paths of travel of the arms 284. When the totalizer shaft 223 is turned by the key 260 to restore the totalizer elements 224 to zero, the cam 279 rocks the bell crank lever 280 and its shaft 281 and all of the arms 284, until they contact the fingers 233 of the carrying pawls 235 and hold them out of contact with the shoulders 237. When the latches 231 are tripped as the totalizer elements 224 are being turned to zero, the latches rock idly back and forth and again permit the shoulders 232 to engage with the fingers 233. When the totalizer shaft 223 reaches home position, the cam 279 permits the spring 282 to rock the arms 284 away from the fingers 233 so that the latter may again engage the shoulders 237 of the trip latches 231.

*Indicator mechanism*

The mechanism herein provided for adjusting the indicators is of the type in which the indicators are always first brought to zero, and then adjusted to their new positions under control of the differential mechanism. In the present embodiment a novel means is provided for adjusting the indicators by utilizing the adding movement of the totalizer elements themselves while the amount is being added therein. Pivoted on the cross rod 180 (Fig. 2), adjacent each of the segmental actuators 181 is a companion segment 290 provided with teeth 291 identical and concentric with the teeth 182 of the actuators 181. The totalizer pinions 205 are wide enough to engage both the teeth 291 of the indicator segments 290 and the teeth 182 of the actuators 181. The indicator segments 290 are also provided with teeth 292 which mesh with gears 293, each of which is secured to the left hand end of a cross shaft 289 or one of the nested sleeves 294 surrounding the cross shaft 289. The gears 293 also mesh with gears 295 carried on a rod 296, which gears 295 mesh with pinions 297 secured to roller indicators 298. The indicators are carried on a horizontal rod 299 supported by the side frames 51 and 52. Each indicator segment 290 is provided with an abutting face 300. As the restraining and restoring bar 186 is rocked forwardly in a manner heretofore described, it contacts the abutting faces 300 of such of the indicator segments 290, as may stand in other than their home positions, to restore them and all of the indicators to their zero positions. It will be remembered that during the forward movement of the restraining and restoring bar 186, the actuators 181 are adjusted under control of the depressed keys. After all of the indicator segments 290 have been set to their zero positions, and the actuators 181 are adjusted, the totalizer pinions 205 are engaged therewith. After the pinions 205 have thus been engaged, the restraining and restoring bar 186 is returned to its home position, thereby returning all of the actuators 181 to their home positions. Since the pinions 205 mesh with both the actuators 181 and the indicator segments 290, it is apparent that the actuators enter the amount into the totalizer elements 224 and the totalizer elements will adjust the indicators according to the amount added therein by means of the indicator segments 290 and the trains of gears 293, 295 and 297.

When the indicator segments 290 (Fig. 2) are being set to their zero positions in a clockwise direction, the combined momentum of the segments 290, gears 293, 295 and 297 and the indicators may be great enough to overthrow the segments 290, and thereby not only cause an incorrect amount to be indicated and printed, but it might also disengage the segments from the gears 293. In order to prevent this, a stop rod 301 carried by the side frames 51 and 52 is provided which extends through slots 302 in the gears 295 and limits the movement of the indicator segments 290. The slots 302 in the gears 295 are of sufficient length to enable the gears to rotate the indicators 298 from their "zero" to their "nine" positions, the end walls of the slots lying in contact with the stop rod 301 when the indicators are at either of their extreme limits of travel.

Indicator alining devices

Figure 15:
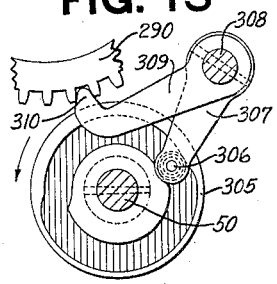
Fig. 15 is a fragmentary detail view of the differential and indicator alining mechanism.

Alining devices are provided for holding the indicators 298, the actuators 181 and the indicator segments 290 in the positions in which they are left when the machine comes to rest. Secured to the shaft 50 (Figs. 2 and 15) is a cam 305 cooperating with a roller 306 on an arm 307 carried by a shaft 308. Also secured to the shaft 308 is an alining arm 309 for each bank of keys having an alining tooth 310 wide enough to engage both the paired indicator segment 290 and the actuator 181. Also secured to the shaft 308 is an arm 311 connected by a link 312 to an arm 313 secured to a shaft 314 carried by the side frames 51 and 52. Also secured to the shaft 314 is an alining dog 315 for each indicator adapted to cooperate with the pinion 297 secured to the indicator 298. The cam 305 is so formed that at the beginning of the rotation of the drive shaft 50, the arm 307 is rocked counter-clockwise (Fig. 15), thereby disengaging the alining teeth 310 from the actuators 181 and the indicator segments 290, and by means of the link 312, disengaging the aliner dogs 315 from the pinions 297, thereby permitting the actuators to be set under control of the keys and the indicator segments 290 to be moved to their zero positions. After the indicator segments 290 have been positioned according to the value of the keys depressed, and the actuators 181 have been returned to their home positions, the aliners 309 are again rocked to engage the alining teeth 310 with the indicator segments 290 and the actuators 181, and the aliners 315 are rocked to engage the pinions 297.

Type wheels

Type wheels are provided for recording the data set up on the keyboard. Two sets of type wheels are provided, one for printing the data on a detail strip which remains in the machine, and the other for printing the data on a receipt which is issued from the machine. Loosely mounted on parallel shafts 320 and 321 (Fig. 30) carried by a printer frame 334 and a bracket plate 324 (Fig. 26) are the similar sets of type wheels 322 and 323, respectively. The type wheels 322 are the wheels for recording the data on the detail strip, and the wheels 323 are for printing the data on the receipt. Secured to each type wheel of each set is a pinion 325 which meshes with its appropriate gear of a series of intermediate gears 326 common to the two sets of type wheel pinions and secured to the right hand ends of the sleeves 294 and of the cross shaft 289. It will be remembered that the gears 293 which are adjusted by the indicator segments 290 are secured to the left hand ends of the sleeves 294 and the cross shaft 289. Therefore, the movement of the segments 290 will be transferred to the gears 326 by the gears 293 and the sleeves 294. From this it is apparent that the position to which the indicator segments 290 are adjusted by the totalizer pinions 205 determines the setting of the type wheels 322 and 323.

Type wheel aliner

An aliner is provided for properly alining the sets of type wheels before the impression is taken therefrom. Cut in the side of the gear 69 on the cross shaft 70 is a cam groove 330 which cooperates with a roller 331 (Figs. 30 and 34) mounted on an arm 332 secured to a shaft 333 carried by the printer frame 334 and the bracket plate 324. The tail of the arm 332 carries a stud 335 which projects through an opening 336 in the printer frame 334 and into a hole in one arm of an aliner yoke 337 journaled on the shaft 333. The yoke 337 is provided with an alining bar 338 which is long enough to engage all of the intermediate gears 326. At the beginning of the rotation of the shaft 70, the cam groove 330 disengages the aliner bar 338 from the gears 326 and holds it disengaged until the sets of type wheels have been adjusted to their new positions, whereupon the cam groove 330 again rocks the aliner bar 338 into engagement with the gears 326.

*Receipt paper feeding mechanism*

The receipt paper 355 is fed from a supply roll 356 (Fig. 26) carried on a stud mounted in the printer frame 334, upwardly through a paper chute 357 (Fig. 37). The paper chute is provided with two ears 358 and 359 by which it is attached to the printer frame 334. The side of the chute is provided with two openings (Figs. 30 and 37), one for permitting data to be printed from a printing cylinder 360 mounted on the cross shaft 70, and the other for permitting data to be printed from the receipt printing type wheels 323, as shown in Fig. 30. The printing cylinder 360 (Fig. 37) is of a well known type and it is thought to be unnecessary to describe it in detail here, as reference may be had to Letters Patent of the United States, No. 483,511, issued to H. Cook, September 27, 1892, and No. 541,247, issued to Wm. Murphy, June 18, 1895. It is sufficient to state here that the printing cylinder is rotatably mounted between the printer frame 334 and a side plate 361. The before-mentioned shaft 70 has secured thereto the gears 69 and 71. It will be remembered that the gear 71 is driven from either the operating handle 60 or the motor 30. From this it is apparent that on each operation of the machine the printing cylinder 360 will receive one complete rotation.

Also mounted between the printer frame 334 and the side plate 361 is an eccentric shaft 362 (Fig. 37) upon which is rotatably mounted an impression roller 363. The printing cylinder 360 is provided with a feed rail 364 which cooperates with the impression roller 363 to feed the receipt paper the length of a receipt on each operation. The printing cylinder 360 is provided with type wheels 365 (Fig. 38) for printing the date and consecutive number on the receipts, and also with an electro 366 for printing any desired data. When the cylinder is rotated as above mentioned, and the feed rail 364 carries the receipt paper against the impression roller 363, the electro 366 and type wheel 365 will print on the receipt paper as it is being fed.

An ink roller 367, (Figs. 37 and 38) carried between two arms 368, is provided for inking the electro 366 and the type wheels 365 just before they come into contact with the impression roller 363, as just described. The arms 368 are held against a stud 369 carried by the printer frame 334 by a spring 370. The arms 368 are connected by means of a cross bar 371 which has a downwardly extending thumb piece 372 which permits the arms 368 to be rotated in a counter-clockwise direction against the tension of the spring 370 for removing the ink roller 367 when it is desired to re-ink it.

This method of obtaining an impression is old and well known in the art, and it is, therefore, thought unnecessary to make any further reference thereto.

The impression roller 363 is so located as to enter the lower opening in the paper chute 357 and in order to make it easier to insert the receipt paper, the impression roller is so mounted that it can be removed therefrom. Slidably mounted on two screw-studs 380 is a slide 381 having a downwardly extending finger piece 382 provided with a flange 383. The slide 381 is provided with an arm 384 near its upper end. An arm 385 is secured to the eccentric shaft 362 supporting the impression roll 363 and is provided with a stud 386 held in engagement with the arm 384 of the slide by a spring 387. When it is desired to insert the receipt paper into the paper chute, the operator rotates the eccentric shaft 362 by lifting the slide 381, thereby causing the arm 385 and shaft 362 to rotate in a counter-clockwise direction. Since the impression roll 363 is eccentrically mounted on the shaft 362, this movement will cause the impression roller 363 to move from the opening in the paper chute.

*Printing hammers*

Two printing hammers (Fig. 30) have been provided, one for printing the data on the receipt, and the other for printing on the detail strip, a single cam 80 adapted to operate both printing hammers and feed the detail strip and the inking ribbon to be hereinafter described.

*Receipt printing hammer*

Pivoted on a stud 395, mounted on the printer frame 334, is a hammer 396 (Figs. 30 and 36) provided with a resilient platen 397 which cooperates with the type wheels 323 for printing data on the receipt. The hammer 396 is provided with a downwardly projecting arm 398 having a stud 399 mounted thereon. Pivoted on a stud 400 carried by the side frame 52 (Fig. 36) in alinement with the stud 395 on frame 334, is a driving arm 401 (see also Fig. 30) provided intermediate its ends with a roller 402. Also carried on the driving arm 401 is a block 403. The roller 402 is held in engagement with the cam 80 by a spring 404 stretched between a stud 405 on the driving arm 401 and a stud 406 on the side frame 52. A spring 407 stretched between a stud 408 on the arm 401 and the before-mentioned stud 399 of the hammer 396 holds the stud 399 in engagement with the driving arm 401. The cam 80 is provided with a shoulder 409. As the shoulder 409 passes from beneath the roller 402, during the rotation of the cam, the block 403 contacts therewith. The cam is wide enough to contact the roller 402 and the block 403 successively. Upon continued rotation of the cam 80, the block 403 will pass beyond and drop off the high part of the cam 80 whereupon the spring 404 rotates the driving arm 401 rapidly about its pivot 400. This movement is transmitted to the impression hammer 396 by the stud 399 thereon. When the roller 402 strikes the low portion of the cam 80, the driving arm 401 is arrested but the momentum of the hammer 396 is sufficient to carry it forward to take an impression from the type wheels 323, after which the spring 407 again pulls the stud 399 into contact with the arm 401 to withdraw the hammer from the type wheels. Upon continued rotation of the cam 80, the driving arm 401 is raised and thereby returns the hammer 396 to its normal position.

From the above description it can be seen that the roller 402 engages the cam 80 during the greater part of the rotation thereof, and that the block 403 provides means for quickly tripping the impression hammer. By this construction the minimum amount of friction is placed on the mechanism, and at the same time, the hammer is given a quick sharp movement.

Detail impression hammer

Mounted on a stud 415 carried by the side frame 52 (Fig. 30) is a hammer 416 carrying an impression platen 417 adapted to take an impression from the detail strip printing wheels 322. The hammer is located between the side frame 52 and the printer frame 334, and is formed with a lateral extension at its free end to project through an opening in the printer frame 334, as shown in Figs. 30 and 33. The hammer 416 is provided with a downwardly extending arm 418 which has mounted thereon a stud 419 projecting into the path of a shoulder 428 of a lever 420 mounted on the stud 415 and slotted to embrace a stud 421 carried by the driving arm 401. Mounted on the side frame 52 (Figs. 30 and 33) is a stud 422 which projects into the path of the printing hammer 416. A spring 423 stretched between a stud 424 mounted on the printing hammer 416 and a stud 425 mounted on the side frame 52, normally holds the printing hammer 416 against the stud 422. A spring 426 tretched between a stud 427 on the right hand end of the lever 420 and a stud carried by the side frame 52 normally tends to rotate the lever 420 in a clockwise direction, but is prevented from doing so by its connection with the driving arm 401. When the driving arm 401 is rapidly rotated in a counter-clockwise direction by the spring 404, as above described, the lever 420 is rotated therewith, to snap the shoulder 428 on the lever 420 into contact with the stud 419 of the printing hammer 416, thereby causing the hammer 416 to be rapidly rotated thereby in clockwise direction. When the lever 420 is stopped by the contact of the roller 402 with the low portion of the cam 80, the momentum of the hammer 416 will be sufficient to carry it against the type wheels 322 to impress the types of type wheels 322 on the detail strip.

Detail strip feed

After the impression has been made on the detail strip, means is operated to feed or advance the strip one step. The detail paper 434 (Fig. 30) is fed from a supply roll 435, carried on the stud 436, mounted in the printer frame 334, over studs 437, 438, 439 and 440, and from there onto a receiving roll 441. The receiving roll is rotatably mounted on a stud 442 (Fig. 29) carried by the printer frame 334. Secured to the receiving roll 441 is a ratchet wheel 443 actuated by a feed pawl 444 pivoted on an arm 445 of the lever 420. A spring 446 holds the pawl 444 in contact with the ratchet wheel 443. As the lever 420 is given its clockwise movement to cause the impression hammer 416 to take an impression from the type wheels 322, the pawl 444 is moved upwardly to engage the next tooth on the ratchet wheel 443. As the lever 420 is returned to its home position, the pawl 444 rotates the receiving roll one step in counter-clockwise direction, thereby winding the detail paper 434 thereon.

A retaining pawl 447 (Fig. 29), pivoted on a stud 448, is provided for preventing retrograde movement of the receiving roll 441. A spring 449 holds the retaining pawl in contact with the ratchet 443.

Ribbon feeding mechanism

An endless ink ribbon 455 (Fig. 30) is provided for taking the impressions from the type carriers. An ink roller 456 (see also Fig. 33) is rotatably mounted on a sleeve 457 secured at one end to a short stud 458 mounted on a ribbon plate 459. The opposite end of the sleeve 457 is slidably mounted on a stud 460 carried by the side frame 52. The ribbon plate 459 has mounted thereon four guide studs 461. Also mounted on the ribbon plate 459 are two short studs 462 (see also Fig. 33) to which are secured the outer ends of sleeves 463. The inner ends of the sleeves 463 are slidably mounted on pilot studs 464 (Fig. 33) carried by the printer frame 334. The ribbon 455 is adapted to be fed around the inking roller 456 over the studs 461 and sleeves 463.

From the above description it can be seen that the inking roll 456, studs 461 and sleeves 463 are all mounted on the ribbon plate 459, and therefore, this forms a removable support for the ribbon. The ribbon plate 459 is held in place by means of two screws 465 (Fig. 26). If it is desired to remove the ribbon, all that is necessary is to remove the two screws 465 and the handle 60, and slide the ribbon plate with its ribbon mechanism off the pilot studs 462.

Also loosely mounted on the stud 460 on the side frame 52 and adjacent thereto is a ratchet 470 (Figs. 30, 31 and 33) provided with a hub having two prongs 471 which enter openings 472 (Fig. 33) on the inner end of the inking roller 456. A collar 473 secured to the stud 460, and a shoulder 474 on the stud, provide a means for laterally spacing the ratchet 470 on the stud 460. Pivoted on a stud 475, carried by the side frame 52, is an arm 476 (Figs. 30 and 31) having pivoted thereto a feed pawl 477, held in contact with the ratchet 470 by a spring 478. Also mounted on the arm 476 is a stud 479 which projects into an opening 480 (Fig. 30) in the before-mentioned lever 420. When the lever 420 is rocked in a counter-clockwise direction, as above described, the pawl 477 is carried upwardly to rotate the ratchet 470 in a clockwise direction, thereby feeding the ribbon far enough to provide new inking surfaces for the platens 397 and 417.

A retaining pawl 481 (Fig. 31), pivoted on a stud 482, carried by the side frame 52, prevents retrograde movement of the inking roller 456. A spring 483 holds the pawl 481 in engagement with the ratchet 470.

A tension roller 485 (Figs. 30, 32 and 33) is provided to place a proper tension on the inking ribbon, so that the ribbon will be properly fed through the machine. The roller 485 is rotatably mounted on a rod 486, carried by an arm 487, pivoted on a stud 488 carried by the ribbon plate 459. A spring 489 normally tends to hold the roller 485 in contact with the ink ribbon 455.

Receipt severing mechanism

A mechanism has been provided for severing the receipt after it has been printed and fed from the machine. The upper discharge end of the paper chute 357 (Fig. 30) terminates just beneath and in line with an opening 515 formed through the horizontally disposed sole of an angular bracket 495 (Figs. 35, 37 and 38) fast to the upper end of the printer frame 334. A stationary knife blade 496 is fastened to the upper face of the sole, and is apertured in registry with the opening 515 to form a cutting edge 497. Slidably mounted on the stationary blade 496 is a knife blade 494, provided with an opening having a cutting edge 498. A shaft 501 journaled at its opposite ends in standards 499, 500 projecting upwardly from opposite sides of the bracket 495, carries a pair of feet 502 which are firmly pressed against the stationary knife 494 by springs 503 coiled about the shaft. One end of each of the springs 503 is attached to a foot 502, and the other end to a collar 504, secured to the shaft 501. The collars 504 are provided with a series of holes 505 into which pins 506 are adapted to be inserted for securing them to the shaft. A spacing collar 507, secured to the shaft 501, keeps the collars 504 in proper alinement, so that the holes therein register with the holes in the shaft 501. The object in providing a plurality of holes 505 in the collars 504 is to permit proper tensioning of the springs 503.

The shiftable knife blade 494 is provided with two openings into which the upper ends of arms 508 project. The arms 508 are secured to a shaft 509 carried by the printer frame 334 and the side plate 361. Also secured to the shaft 509 is a downwardly projecting arm 510 provided with a roller 511 projecting into a cam race 512 in a disk 513 secured to the hub of the gear 71.

The cam race 512 is so timed that just before the check paper is fed, as above described, it rocks the arms 508 in a clockwise direction, thereby sliding the knife blade 494 toward the rear of the machine to bring an opening 514 therein into alinement with the opening 515 in the bracket 495 and the opening in the stationary knife blade 496 to permit the receipt paper to be fed therethrough. After a sufficient length of paper has been fed out of the machine, the cam race 512 rocks the arms 508 in a clockwise direction, thereby causing the knife edge 498 of the opening 514 to carry the paper against the knife edge 497 of the stationary blade to sever the paper. At this time the receipt paper projects from the opening 516 in the cabinet of the machine, as shown in Fig. 1. After the receipt has been severed, the operator can remove it from the machine.

Customer counter

Figure 11:
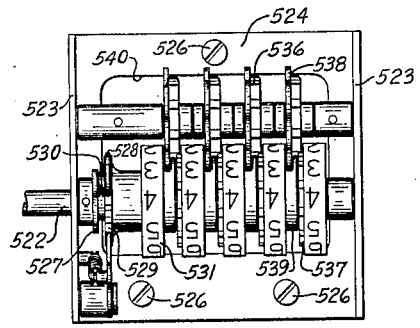
Fig. 11 is a detail view in front elevation of the customer counter.

The usual form of step-by-step counter is provided for counting the number of times the machine is operated. This type of counter is old and well known in the art, and therefore, only a brief description thereof will be given herein. Mounted on the oscillatory disk 188 (Fig. 10) is a stud 520 embraced by a bifurcated arm 521 secured to a shaft 522 (see also Fig. 11) carried by the flanges 523 of a bracket 524 secured by fastenings 526 to the back frame 138 of the machine (Fig. 2) and adjacent an opening 525 in the frame 138. Also secured to the shaft 522 is an arm 527 which has pivoted thereto a pawl 528, held in contact with a ratchet 529 by means of a spring 530. The ratchet 529 is sleeved to the units counter wheel 531.

It will be remembered that the disk 188 is given a clockwise and counter-clockwise (Fig. 10), movement during each operation of the machine. This movement of the disk 188 rocks the arm 521 and by the shaft 522, rocks the arm 527 first counter-clockwise and then clockwise. Clockwise movement of the arm 527 rotates the ratchet 529 one step by the pawl 528, thereby adding "one" into the units wheel 531.

Figure 9:
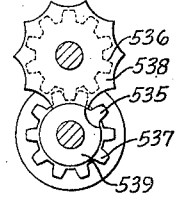
Fig. 9 is a detailed view of the transfer mechanism for the customer counter.

The well known Geneva transfer mechanism shown in Fig. 9 is provided for carrying or transferring "1" to the next higher order when the lower order wheel passes from "nine" to "zero". Each counter wheel is provided with a long tooth 535 which engages a gear 536, as the wheel is passing from "nine" to "zero", to impart one step of movement to the pinion 537 of the next higher element. A locking plate 538 cooperates with a locking disk 539 on the counter wheel and prevents rotation of the counter wheel, except when a transfer is being effected.

Figure 12:
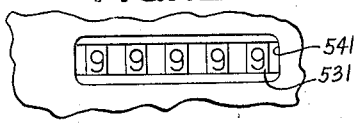
Fig. 12 is a detailed view in rear elevation of the customer counter as it appears through the opening in the cabinet, for permitting the counter to be read.

It is necessary to read the counter from the rear of the machine, and for this reason the bracket 524 is provided with an opening 540 (Figs. 2 and 12), and the cabinet of the machine has an opening 541, which provides means for displaying the number standing on the customer counter.

Operation

In order to enter an amount into the machine and print and issue a receipt, the operator first sets up the amount on the keyboard, together with the ledger number and the clerk's initial, after which the motor bar 90 is depressed, to release the machine. The machine can be operated either manually or by means of the motor. The data which has been set up on the keyboard is transferred to the differential actuators 181 at the beginning of the operation of the machine, after which the totalizer 205, 224 is engaged with the amount bank actuators. After the totalizer has been engaged with the actuators the latter are restored to their home positions, which will enter the amounts into the totalizer elements. This adding movement of the actuators to register amounts into the totalizer is utilized in setting up the type carriers 322, 323 and indicators 298, the totalizer elements themselves forming a coupling means between the actuator, and the indicator and type carrier mechanisms. After the type carriers have been properly adjusted, the printing hammers 396, 416 are released to cause an impression to be taken on both the detail strip, which remains in the machine, and the receipt, which is subsequently fed from the machine. After the receipt has been fed from the machine, the severing mechanism is operated to sever the receipt from the supply. After the impression is made on the detail strip, it is fed one step in order to properly space the impressions on the strip. Once during each operation of the machine the ribbon 455 is given one step of movement in order to provide a fresh inking surface. The impression hammers, the detail feed and ribbon feed are all operated by means of a single cam 80. A counter is also provided by means of which the number of operations of the machine are added.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of an actuator, a spring for operating said actuator in one direction, a universal bar for controlling the operation of said actuator, an operating handle for operating said universal bar positively in opposite directions, a gear operated by said handle, a stud mounted on said gear, a bell crank having one arm normally extending into the path of said stud for stopping said handle intermediate its limits of operation to give the actuator enough time to reach its destination when the bar is operated faster than the actuator is operated by its spring, a segment controlled by said universal bar, a spring for operating said segment, said spring being weaker than the spring of said actuator, a stud on said segment, and a flange on said bell crank extending into the path of said last-mentioned stud, whereby the bell crank is rotated to rock the arm of said bell crank out of the path of said stud when said segment receives its maximum movement in one direction, thereby releasing the operating handle to enable it to complete its operation.

2. In a machine of the class described, the combination of an actuator, a spring for operating said actuator, a universal bar for controlling the operation of said actuator, an operating handle for operating said universal bar positively in opposite directions, means for arresting said handle until said actuator reaches its destination when said bar is operated faster than the actuator is operated by its spring, a segment, a spring for operating said segment, said spring being weaker than the spring for operating said actuator, and a projection on said segment adapted to render said arresting means ineffective when said segment receives its maximum movement in one direction.

3. In a machine of the class described, the combination of an actuator, a plurality of manipulative devices for controlling the extent of movement of said actuator, a spring for operating said actuator in one direction, a universal bar movable in one direction to free the actuator to the action of its spring until arrested by said manipulative devices, means for returning said bar to restore said actuator to its normal position and means to maintain said bar in its operated position until the actuator has reached its destination under the influence of its spring.

4. In a machine of the class described, the combination of an actuator, a spring for operating said actuator in one direction, a bar movable in one direction to free said actuator to the action of its spring, and means to maintain said bar in its operated position until said actuator has reached its destination under the influence of its spring.

5. In a machine of the class described, the combination of an actuator, a spring for operating said actuator in one direction, control means to free the actuator to the action of its spring to position said actuator, and means to maintain said control means in operated position until said actuator has completed its spring-driven travel.

6. In a machine of the class described, the combination of an actuator, a spring to adjust said actuator, an operating handle, means for arresting said handle after the handle has moved a fixed distance, and means to withdraw the arresting means after said actuator becomes adjusted under control of said spring.

7. In a machine of the class described, the combination of an actuator, a spring to adjust said actuator, an operating handle, means for arresting said handle until said actuator becomes adjusted, means for releasing said handle after the actuator has been adjusted and a spring slower in movement than the actuator spring to operate the last named means.

8. In a machine of the class described, the combination with a totalizer pinion, a plurality of manipulative devices, an actuator spring-operated in one direction and adjustable under control of said manipulative devices, a differentially adjustable device; means controlled by said device; means for engaging said pinion with said actuator and with said differentially adjustable device after said actuator has been adjusted under control of said manipulative devices, and means to restore said actuator to its home position to add an amount into said totalizer pinion and through said pinion, to adjust said differentially adjustable device.

9. In a machine of the class described, the combination of a totalizer pinion, an actuator therefore, a differentially adjustable device, means for engaging said pinion with said actuator and with said differentially adjustable device, and means to restore said actuator to its home position to add an amount into said totalizer pinion and through said pinion, to adjust said differentially adjustable device.

10. In a machine of the class described, the combination of an actuator, a differentially adjustable device, a totalizer pinion adapted to couple said differentially adjustable device to said actuator whereby the movement of said actuator will be transmitted to said differentially adjustable device when an amount is being entered on said totalizer pinion.

11. In a machine of the class described, the combination of an actuator, a differentially adjustable device, a totalizer pinion adapted to engage said actuator and said differentially adjustable device whereby movement of said totalizer pinion is transmitted to said differentially adjustable device.

12. In a machine of the class described, the combination with an actuator; resilient means to advance the actuator; a control bar for the actuator; operating means to positively rock the control bar; a locking mechanism normally adapted to arrest the operating means prior to the completion of its operation; and means released for operation by the control bar to disable the locking mechanism, the last-named means operable at less speed than the actuator.

13. In a machine of the class described, the combination with an actuator; resilient means to advance the actuator; a control bar for the actuator; operating means to positively rock the control bar; a locking mechanism normally adapted to arrest the operating means prior to the completion of its operation; and a governor released for operation by the control bar to disable the locking mechanism on operations at normal speed.

14. In a machine of the class described, the combination with an actuator; means to advance the actuator from and restore it to its home position; and means to control the advance of the actuator; of a differentially adjustable device; means adjusted by the differentially adjustable device; and a totalizer element to releasably connect the actuator and differential device.

15. In a machine of the class described, the combination with an actuator; means to advane the actuator from and restore it to its home position; and means to control the advance of the actuator; of a differentially adjustable device; means adjusted by the differentially adjustable device; a totalizer element to releasably connect the actuator and differential device; and means cooperating with said adjusted means to limit the travel of the differentially adjustable device.

16. In a machine of the class described, the combination with an actuator; means to advance the actuator from and restore it to its home position; and means to control the advance of the actuator; of a differentially adjustable device paired with the actuator; and a totalizer element to simultaneously connect and disconnect the actuator and differentially adjustable device.

17. In a machine of the class described, the combination with an actuator; means to drive the actuator in one direction; and means to differentially arrest the actuator on its advance; of a differentially adjustable device; means adjusted by the differentially adjustable device; a restraining and restoring means to free the actuator to the action of its driving means, and to restore the actuator and the differentially adjustable device to their home positions; and means to connect and disconnect the actuator and the differentially adjustable device.

18. In a machine of the class described, the combination with an actuator; means to drive the actuator in one direction from its home position; and means to differentially arrest the actuator on its advance; of a differentially adjustable device having a home position corresponding to the limit of advance of the actuator from its home position; means adjusted by the differentially adjustable device; a restraining and restoring member to free the actuator to the action of its driving means, to restore the differentially adjustable device to its home position as the actuator advances from its home position, and to restore the actuator to its home position; and means to couple and uncouple the actuator and the differentially adjustable member.

19. In a machine of the class described, the combination with a restraining and restoring means; and means to operate the latter; of an actuator and a differentially adjustable device, both of which are controlled by the restraining and restoring means; means to limit the travel of the differentially adjustable device in either of two opposite directions; the restraining and restoring device adapted to normally retain the actuator in its home position; the differentially adjustable device adapted to remain in the position where last adjusted; means to advance the actuator upon its release by the restraining and restoring means; means to differentially arrest the actuator; the restraining and restoring means adapted to restore the differentially adjustable device from any of its adjusted positions to its home position, as the means releases the actuator for operation; a coupling effective to connect and disconnect the actuator and differentially adjustable device; and means to shift the coupling into effective position subsequently to the completion of the advance of the actuator and the restoration to home position of the differentially adjustable device and to shift the coupling into ineffective position prior to the succeeding advance of the actuator; the restraining and restoring means adapted to return the actuator to its home position to adjust the differentially adjustable device through the coupling to a position corresponding with the advance of the actuator.

20. In a machine of the class described, the combination with a segmental actuator; restraining and restoring means therefor having a constant path of travel; means to advance the actuator when the latter is freed by the restraining and restoring means; and means to differentially arrest the actuator on its advance; of a segmental differentially adjustable device; a coupling effective to connect and disconnect the actuator and the differentially adjustable device; the home positions of the actuator and of the differentially adjustable device being located at opposite ends of the travel of the restraining and restoring means; the restraining and restoring device adapted to restore the differentially adjustable device to its home position and free it for advance in a direction opposite to the direction of advance of the actuator; and means to render the coupling effective to connect the actuator and differentially adjustable device prior to the restoration of the actuator to home position.

21. In a machine of the class described, the combination of a segmental toothed actuator having an arcuate opening therein; a restraining and restoring bar passing through the opening and having a constant path of travel longitudinally of the opening; means to advance the actuator; the restraining and restoring bar normally in contact with one end wall of the opening in the actuator to retain the actuator in its home position; means to variously arrest the actuator on its advance when freed to the action of its drive means; a segmental toothed differentially adjustable device concentric with the actuator and having an arcuate opening therethrough substantially in register with the arcuate opening of the actuator, the restraining and restoring bar extending through the opening in the differentially adjustable device, and adapted to restore the differentially adjustable device to its home position, the home positions of the actuator and of the differentially adjustable device, being at the respective opposite limits of the path of travel of the restraining and restoring bar; means to arrest the differentially adjustable member at one limit of its travel; and means to couple the actuator with the differentially adjustable device during the travel of the restraining and restoring bar in one direction.

22. In a machine of the class described, the combination with an actuator; means to drive the actuator in one direction; means to differentially arrest the actuator on its advance; and a restraining and restoring means having a constant path of travel to and fro, to free the actuator to the action of its drive means, and to restore the actuator to its home position; of a differentially adjustable device; and means to couple the actuator with the differentially adjustable device during the travel of the restraining and restoring means in one direction, and to uncouple the actuator and the differentially adjustable device during the travel of the restraining and restoring means in the opposite direction.

In testimony whereof I affix my signature.

WILLIAM H. ROBERTSON.

CERTIFICATE OF CORRECTION.

Patent No. 1,816,263.            Granted July 28, 1931, to

WILLIAM H. ROBERTSON.

It is hereby certified that error appears in the printed specification of the above numbered patent requiring correction as follows: Page 1, line 75, for the misspelled word "elments" read elements; page 2, line 85, strike out "jarring and injurious"; page 4, line 22, for "160" read 1601; line 105, strike out "to be moved"; line 109, after "bar" insert 146; page 12, line 93, for "he" read the; page 13, line 99, claim 1, after "said" second occurrence insert last-mentioned; page 14, line 113, claim 15, for "vane" read vance; and that the said Letters Patent should be read with these corrections therein that the same may conform to the record of the case in the Patent Office.

Signed and sealed this 29th day of September, A. D. 1931.

(Seal)                                                            M. J. Moore,
Acting Commissioner of Patents.